United States Patent
Bock et al.

(10) Patent No.: US 7,417,688 B2
(45) Date of Patent: Aug. 26, 2008

(54) DETECTING AND SELECTING BETWEEN PROGRESSIVE SCANNED AND INTERLACED SIGNALS

(75) Inventors: Alois Martin Bock, Eastleigh (GB); Jeremy Bennett, Eastleigh (GB)

(73) Assignee: Tandberg Television ASA (NO)

( * ) Notice: Subject to any disclaimer, the term of this patent is extended or adjusted under 35 U.S.C. 154(b) by 578 days.

(21) Appl. No.: 11/058,870

(22) Filed: Feb. 16, 2005

(65) Prior Publication Data

US 2005/0185094 A1    Aug. 25, 2005

(30) Foreign Application Priority Data

Feb. 19, 2004    (GB) ................. 0403725.5

(51) Int. Cl.
    *H04N 7/01*    (2006.01)
(52) U.S. Cl. ..................................... 348/558
(58) Field of Classification Search ............... 348/558, 348/448, 441, 443, 446, 458, 459
    See application file for complete search history.

(56) References Cited

U.S. PATENT DOCUMENTS

| | | | |
|---|---|---|---|
| 6,034,733 A * | 3/2000 | Balram et al. ........... | 348/448 |
| 6,700,622 B2 * | 3/2004 | Adams et al. ........... | 348/448 |
| 6,999,128 B2 * | 2/2006 | Kasahara et al. ....... | 348/452 |
| 7,215,376 B2 * | 5/2007 | Adams et al. ........... | 348/452 |
| 2007/0024703 A1 * | 2/2007 | Conklin ................. | 348/97 |

FOREIGN PATENT DOCUMENTS

| EP | 0 743 788 | 11/1996 |
|---|---|---|
| EP | 0 860 992 | 4/1999 |
| EP | 1 182 869 | 2/2002 |

* cited by examiner

*Primary Examiner*—Paulos M Natnael
(74) *Attorney, Agent, or Firm*—Seyfarth Shaw LLP

(57) ABSTRACT

An apparatus for automatically detecting and selecting between progressively scanned and interlaced signals has an input video signal 11 applied to a progressive frame detector 12, a de-interlacer 14 and a compensating delay 13 which has the same latency as the de-interlacer 14. The progressive frame detector determines if the input video signal is an interlaced signal or a progressively scanned signal. If it is determined that the applied signal is interlaced, then output from the de-interlacer 14 is selected. If, on the other hand, it is determined that the applied signal is progressively scanned, then the input video signal is selected after passing through the compensating delay. In both instances, the selected output is a progressive video signal 19 which may be transmitted if the device is used in an encoder or applied to a display device if the apparatus is used in a decoder.

4 Claims, 2 Drawing Sheets

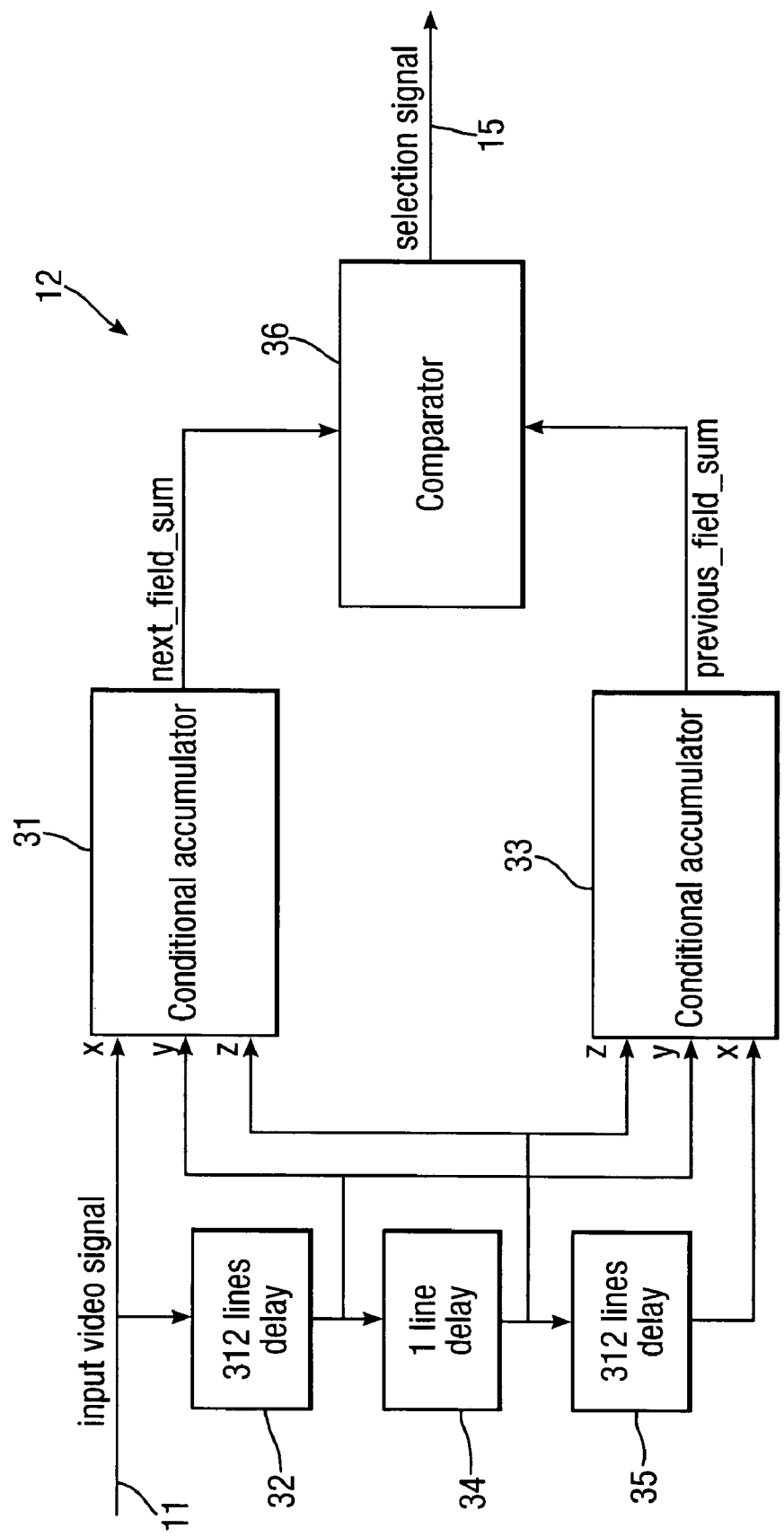

DETECTING AND SELECTING BETWEEN PROGRESSIVE SCANNED AND INTERLACED SIGNALS

BACKGROUND OF THE INVENTION

1. Field of the Invention

This invention relates to an apparatus for detecting and selecting between progressively scanned signals and interlaced signals.

2. Description of the Related Art

Historically, television broadcast signals are transmitted and received in an interlaced form such that, in a first field, odd numbered lines of a picture are firstly transmitted followed by even numbered lines so that two transmitted fields are subsequently interlaced to make up a frame of a television picture. In such a system, an interlaced display at a receiver is normally a cathode ray tube. However, with the use of personal computer (PC) systems, pixels on a display are scanned and energised progressively in, for example, a line-by-line fashion using a PC graphics card and, for example, a plasma display. There is an existing trend away from interlaced displays towards progressive displays for consumer viewing where consumers are not only viewing films and matter downloaded or uploaded into the PC, but also watching normally broadcast television on a PC monitor display.

Such progressive displays associated with PC systems may be, for example, liquid crystal displays (LCD) or plasma displays. However, because of differences between an interlaced display and a progressive display, so, in practice, progressive displays are not able to display interlaced material without aberrations. Such aberrations are called "interlace artefacts" which appear wherever there is motion and, in particular, fast motion. These artefacts take the form of zig-zag jagged edges of moving objects. Such artefacts are annoying to a viewer and, in systems which are set up to purely display interlaced signals in a progressive manner on a progressive display, so a process known as de-interlacing is used and such a process is described in EP-A-0160063.

In present day broadcasts it is often required to insert progressive, film-type sequences into an interlaced signal, e.g. where an advertisement is inserted into a conventionally scanned interlaced broadcast programme.

It has long been known in the tele-cine art that it is possible to convert 24 frames per second video into 30 frames per second video signals in a process called 3:2 pull down. This process repeats every fourth field to thereby convert film into a picture quasi-interlaced format. Since the repeated fields are readily detectable, so transmitted broadcast signals are easily reversed back to their original format at a receiver. Thus, most encoders reverse the 3:2 pull down structure back to the original 24 progressive frames per second. In order to convert 24 frames per second into 25 frames per second video, the 24 frame per second film is played out 4.17% faster so as to provide 25 frames per second. By such an expedient, each film frame is converted into two consecutive video fields, thereby providing a one-to-one match between film frames and video frames. Computer graphics, cartoon videos and many other sources are typically generated using progressive frames with 25 or less motion cycles per second. Difficulty arises where such progressively derived material is intermingled with interlaced (TV camera) video signals with 50 motion cycles per second.

It is known from Signal Processing: Image Communication, an article by A. Bock "Motion Adaptive Standards Conversion Between Formats Of Similar Field Rates", $10^{th}$ Dec., 1993, publisher Elsevier, to pass a progressive by scanned signal through a de-interlacer. Such a motion-adaptive de-interlacer is shown in block schematic form in FIG. 1.

Referring to FIG. 1, an interlaced video signal on an input 1 is applied to a motion detector 2, a vertical filter 3 and a temporal filter 4. The motion detector provides a motion signal output 5 which controls a switch 6 that selects between output 7 of the vertical filter and output 8 of the temporal filter provides a progressive video signal output 9. Thus, the interlaced video signal input undergoes two types of filtering process. The vertical filter 3 samples the current field only so as to provide intra-field filtering thereby interpolating video samples in areas of fast motion. The temporal filter 4 is used to provide inter-frame filtering so as to interpolate video signals in area of little or no motion. The motion detector 2 selects the appropriate filtered signal on a pixel-by-pixel basis. Because the motion detector detects frame differences between video frames, the vertically filtered signal is used in moving picture areas even if the applied signal is changed to the progressive format. Such filtering of a progressively scanned signal produces a lower vertical resolution at the output 9 than the applied signal at input 1.

Thus, applying a progressively scanned signal to a de-interlacer produces a lower vertical resolution at output 9 than the applied signal at input 1 when viewed on a progressive display. As described above, applying an interlaced signal to a progressive display without de-interlacing produces annoying artefacts. Applying an interlaced signal through a de-interlacer produces a higher vertical resolution than the applied signal when viewed on a progressive display.

If compression is used, de-interlacing the video signal before encoding has the added advantage that it saves bit rates, since most compression algorithms such as MPEG-2 and H.264 are more efficient on progressive than on interlaced video signals.

It is to be understood that the interlacing may be performed either at an encoder or a decoder.

De-interlacing usually uses some form of vertical-temporal filtering which has the disadvantage of not only modifying interlaced frames, but also modifies progressive frames. The net result tends to be a reduction in vertical resolution of progressive frames where there is motion.

SUMMARY OF THE INVENTION

The present invention seeks to provide an apparatus and method which may be used at an encoder or a decoder in which interlaced and progressively scanned signals may be automatically detected.

According to a first aspect of this invention there is provided an apparatus for detecting and selecting progressively scanned signals and interlaced signals including:

input video signal means;

frame detector connected to said input video signal means and arranged to detect whether an input video signal applied to said input video signal means is a progressively scanned signal or an interlaced signal;

de-interlacer means connected to said input video signal means arranged to de-interlace an applied interlaced signal; and compensating delay means connected to said input video signal means arranged to provide a delay in dependence upon a latency of the de-interlacer means;

wherein said frame detector means is arranged to select an output from one of said compensating delay means and said de-interlacing means in dependence upon whether the applied signal is a progressively scanned signal or an interlaced signal respectively.

Preferably, the input video signal is a 625 line TV signal.

Advantageously, the frame detector means is a progressive frame detector means comprising:

first and second conditional accumulator means which are each arranged to receive said input video signal and each of which are arranged to perform, for each video field the function:

if ((x>y AND x>z) OR (x<y AND x<z)) then field_sum=field_sum+|x−y|+|x−z| where x, y and z are a conditional accumulation of video luminance samples of the applied video signal;

AND and OR are Boolean operators; and

|x| is the absolute of view sample x;

where the samples are applied to the first conditional accumulator means with the delays:

sample x—zero delay;

sample y—312 line delay;

sample z—313 line delay;

and the samples are applied to the second conditional accumulator means with the delays:

sample x—625 line delay;

sample y—312 line delay;

sample z—313 line delay;

and an output of each of the first and second conditional accumulator means is connected to comparator means arranged to detect whether the input video signal is progressive or interlaced scanned in dependence upon the conditions:

| Condition | Result |
| --- | --- |
| next_field_sum/previous_field_sum > 0.25 AND next_field_sum/previous_field_sum < 4 | current field is part of an interlaced frame |
| next_field-sum/previous_field_sum >= 4 | current field is part of a progressive frame with the previous field |
| next_field_sum/previous_field_sum <= 0.25 | current field is part of a progressive frame with the next field | whereby if the current field is detected to be part of an interlaced frame the frame detector means selects an output from said de-interlacer means, otherwise an output from said compensating delay means is selected.

Advantageously, the apparatus is used in one of a decoder and an encoder.

According to a second aspect of this invention there is provided a method for automatically detecting and selecting between progressively scanned signals and interlaced signals including the steps of applying an input video signal to each of a progressive frame detector, a compensating delay and an interlacer, said progressive frame detector being arranged to detect whether the applied input video signal is a progressively scanned signal or an interlaced signal, the de-interlacer means is arranged to de-interlace an applied interlace video signal and the compensating means is arranged to provide a delay depending upon the latency of the de-interlacer means, said progressive frame detector means selecting an output from either of the compensating delay means or the de-interlacing means in dependence upon whether the applied signal is a progressively scanned signal or an interlaced signal respectively.

BRIEF DESCRIPTION OF THE DRAWINGS

The invention will now be described, by way of example, with reference to the accompanying drawings in which:

FIG. 3 shows in block schematic form a progressive frame detector used in this invention.

In the Figures like reference numerals denote like parts.

DESCRIPTION OF THE PREFERRED EMBODIMENTS

Figure 2:
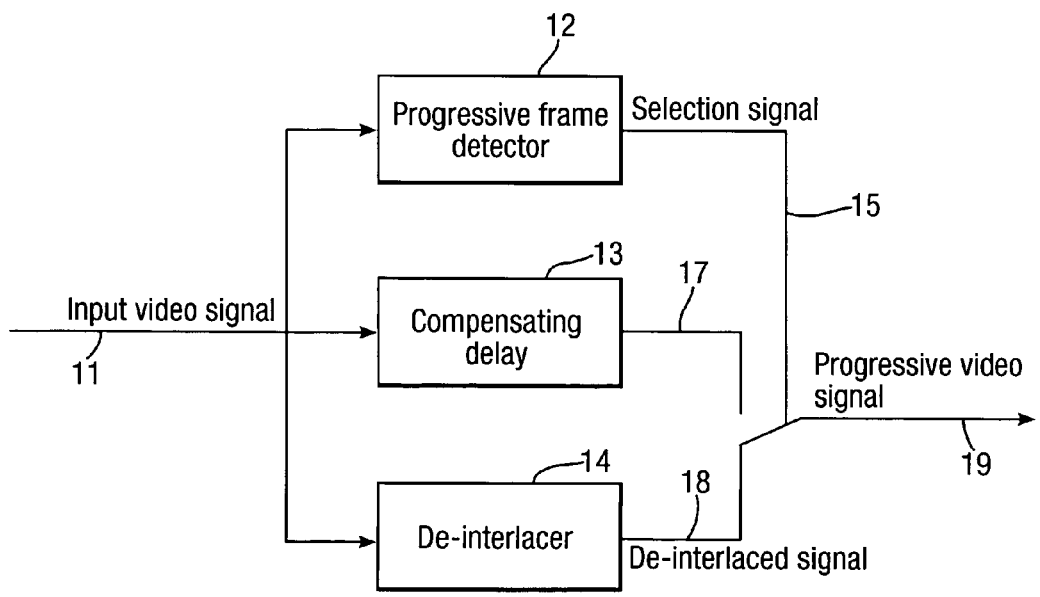
FIG. 2 shows an apparatus for automatically detecting and selecting between progressively scanned and interlaced signals in accordance with this invention.

The apparatus shown in FIG. 2 has an input 11 for an input video signal which is applied to each of a progressive frame detector 12, a compensating delay 13 and a de-interlacer 14.

Figure 1:
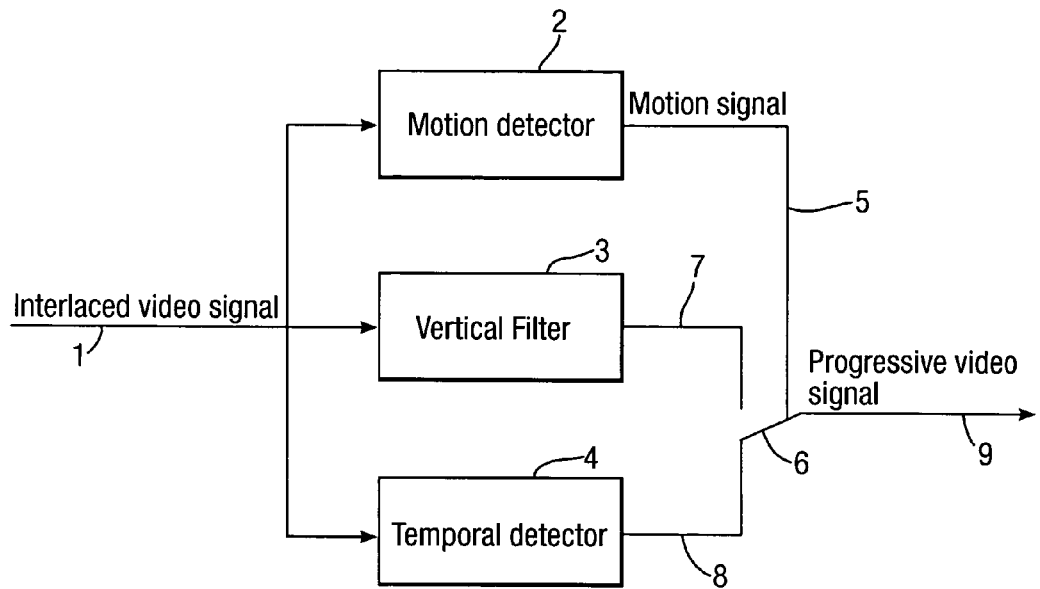
FIG. 1 shows in block schematic form a known motion-adaptive de-interlacer.

The de-interlacer may be as shown and described with reference to FIG. 1 hereinabove. De-interlacers have an inherent latency, typically of one field duration, and the compensating delay has a delay similar to that of the latency of the de-interlacer 14 so typically the compensating delay also introduces a one field delay.

The applied input video signal may be a combination of interlaced scanned signals and progressively scanned signals. In one embodiment, the progressive frame detector determines for each frame whether the frame is progressively scanned or whether it is interlaced scanned by checking correlation between adjacent fields. If there is a strong correlation between two consecutive fields, but a weak correlation between the second and third consecutive fields, then it is determined that the applied video signal is progressively scanned, whereas if there is strong correlation between three consecutive fields, then it is determined that the applied input video signal is an interlaced scanned signal.

The progressive frame detector 12 provides a selection signal 15 to control a switch 16 that selects either an output 17 of the compensating delay 13 or an output 18 of the de-interlacer 14 respectively to thereby provide a progressive video signal which is provided on an output 19. Thus, if progressive scanning is detected by the detector 12, the switch 16 is activated to switch to output 17 of the compensating delay, thus bypassing the de-interlacer and thereby preserving vertical-temporal resolution. If, on the other hand, the detector detects that the current frame is interlaced, then the switch 16 is switched to output 18 to select output from the de-interlacer 14.

Thus, by the present invention, if an applied input video signal is interlaced, the de-interlacer 14 is selected to thereby provide on a progressive display a higher vertical resolution than the applied input video signal, and, also, annoying interlace artefacts are avoided. On the other hand, if the input video signal is progressively scanned, then a de-interlacer is avoided and the display on a progressive display has resolution unchanged between input and output of the apparatus, thereby avoiding the lower vertical resolution between input and output that would otherwise have been incurred if the applied input video signal had been fed through a de-interlacer, as in the prior art.

The progressive frame detector 12 is shown in greater detail in FIG. 3 in which the input video signal is applied as input x to a first conditional accumulator 31 and to a 312 line delay 32. Output of the delay 32 is applied as input y to the first conditional accumulator 31 and to an input y of a second conditional accumulator 33. Output of the delay 32 is also applied to a one line delay 34 which provides output z of conditional accumulators 31 and 32. The output of the delay 34 is also applied to a 312 line delay 35 having the output thereof applied as input x to the second conditional accumulator 33.

An output of the first conditional accumulator 31 is a next_field_sum which is applied as a first input to a comparator 36 and an output of the second conditional accumulator 33 is a previous_field_sum which is applied as a second input to the comparator 36.

It will be understood that the delays 32, 34, 35 are set for 625 line television signals, but it will be appreciated by those skilled in the art that other delays for other video scanning formats may be utilised.

The conditional accumulators 31 and 33 are identical and perform the following mathematical function for each video field.

if ((x>y AND x>z) OR (x<y AND x<z)) then
field_sum=field_sum+|x−y|+|x−z| where x, y and z are a conditional accumulation of video luminance samples of the applied video signal;
AND and OR are Boolean operators; and
|x| is the absolute of view sample x.

At the end of each field the accumulated field_sum values are compared in the comparator 36 which decides whether the input video signal is progressive or interlaced scanned, the comparator making such determination based upon the following conditions:

| Condition | Result |
| --- | --- |
| next_field_sum/previous_field_sum > 0.25 AND next_field_sum/previous_field_sum < 4 | current field is part of an interlaced frame |
| next_field-sum/previous_field_sum >= 4 | current field is part of a progressive frame with the previous field |
| next_field_sum/previous_field_sum <= 0.25 | current field is part of a progressive frame with the next field |

The output of the comparator is the selection signal 15.

If the current field is determined to be part of an interlaced frame, the selection signal selects the de-interlaced signal on output 18, otherwise the de-interlacer is bypassed and the selection signal selects the output 17 of the input video signal delayed through the compensating delay.

Thus, the present invention detects, on a frame-by-frame basis, whether the incoming video frame is progressive or interlaced scanned. If the incoming video frame is progressively scanned it is passed through the apparatus unchanged apart from delay in delay 13. On the other hand, if the frame is determined to be interlaced scanned, it is passed through a de-interlacing process. The apparatus, therefore, permits automatic determination of interlaced or progressive scanned video for output without user interaction and, in making such determination the applied video signals, whether they be interlaced or progressively scanned, are optimally processed.

The apparatus may be used at an encoder or a decoder, although it is currently expected to be usually used at a decoder.

The use of the present invention is, therefore, useful for any progressive display device such as those utilising PC graphics cards and plasma displays.

The vertical resolution of the resultant video frame when an interlaced signal is applied as the input video signal is greater than that of the original interlaced signal which allows the use of more down-sampled (in a vertical direction) video resolutions such as ¾×¾D1 (full resolution digital TV signals). The present invention, by removing interlace artefacts where an interlaced input video signal is used, reduces the information contained within the video resulting in the bit rate required to achieve the same visual quality being reduced, thereby achieving another advantage.

Although the invention has been described by way of example to preferred embodiments, it will be understood by those skilled in the art that modifications may be made within the spirit and scope of the appended claims.

The invention claimed is:

1. An apparatus for detecting and selecting progressively scanned signals and interlaced signals including:
   input video signal means;
   de-interlacer means connected to said input video signal means to de-interlace an applied interlaced signal;
   compensating delay means connected to said input video signal means to provide a delay in dependence upon a latency of the de-interlacer means;
   frame detector means connected to said input video signal means to detect whether an input video signal applied to said input video signal means is a progressively scanned signal or an interlaced signal;
   said frame detector means being a progressive frame detector means comprising:
   first and second conditional accumulator means which are each arrange to receive said input video signal and each of which are at-ranged to perform, for each video field the function:

If ((x>y AND x>z) OR (x<y AND x<z)) then field_sum=field_sum+|x−y|+|x−z| where x, y and z are a conditional accumulation of video luminance samples of the applied video signal;
   AND and OR are Boolean operators; and
   |x| is the absolute of view sample x;
   where the samples are applied to the first conditional accumulator means with the delays:
   sample x —zero delay; sample y—312 line delay;
   sample z 313 line delay;
   and the samples are applied to the second conditional accumulator means with the delays:
   sample x—625 line delay;
   sample y—312 line delay;
   sample z—313 line delay;
   and an output of each of the first and second conditional accumulator means is connected to comparator means arranged to detect whether the input video signal is progressive or interlaced scanned in dependence upon the conditions:

| Condition | Result |
| --- | --- |
| next_field_sum/previous_field_sum > 0.25 AND next_field_sum/previous_field_sum < 4 | current field is part of an interlaced frame |
| next_field_sum/previous_field_sum >= 4 | current field is part of a progressive frame with the previous field |
| next_field_sum/previous_field_sum <= 0.25 | current field is part of a progressive frame with the next field | wherein if the current field is detected to be part of an interlaced frame the frame detector means selects an output from said de-interlacer means, otherwise an output from said compensating delay means is selected.

2. An apparatus as claimed in claim 1, wherein the input video signal is a 625 line TV signal.

3. An apparatus as claimed in claim 1, wherein the apparatus is included in one of a decoder and an encoder.

4. A method for automatically detecting and selecting between progressively scanned signals and interlaced signals including the steps of applying an input video signal to each of a progressive frame detector, a compensating delay and a de-interlacer, the de-interlacing means de-interlacing an applied interlace video signal, the compensating means providing a delay depending upon the latency of the de-interlacer means, and said progressive frame detector means including first and second conditional accumulator means which each receive said input video signal and each perform, for each video field the function:

if((x>y AND x>z) OR (x<y AND x<z)) then field_sum=field_sum+|x−y|+|x−z| where x, y and z are a conditional accumulation of video luminance samples of the applied video signal;
AND and OR are Boolean operators; and
|x| is the absolute of view sample x;
where the samples are applied to the first conditional accumulator means with the delays:
sample x—zero delay;
sample y—312 line delay;
sample z—313 line delay;
and the samples are applied to the second conditional accumulator means with the delays:
sample x—625 line delay;
sample y—312 line delay;
sample z—313 line delay;
and an output of each of the first and second conditional accumulator means is connected to comparator means which detects whether the input video signal is progressive or interlaced scanned in dependence upon the conditions:

| Condition | Result |
| --- | --- |
| next_field_sum/previous_field_sum > 0.25 AND next_field_sum/previous_field_sum < 4 | current field is part of an interlaced frame |
| next_field_sum/previous_field_sum >= 4 | current field is part of a progressive frame with the previous field |
| next_field_sum/previous_field_sum <= 0.25 | current field is part of a progressive frame with the next field | wherein if the current field is detected to be part of an interlaced frame the frame detector means selects an output from said de-interlacer means, otherwise an output from said compensating delay means is selected.

* * * * *

UNITED STATES PATENT AND TRADEMARK OFFICE
CERTIFICATE OF CORRECTION

PATENT NO. : 7,417,688 B2  Page 1 of 1
APPLICATION NO. : 11/058870
DATED : August 26, 2008
INVENTOR(S) : Bock et al.

It is certified that error appears in the above-identified patent and that said Letters Patent is hereby corrected as shown below:

In Column 6, Line 29, in Claim 1, delete "at-ranged" and insert -- arranged --, therefor.

Signed and Sealed this

Thirty-first Day of March, 2009

JOHN DOLL
*Acting Director of the United States Patent and Trademark Office*